(12) United States Patent
Kirbas et al.

(10) Patent No.: US 6,449,497 B1
(45) Date of Patent: Sep. 10, 2002

(54) SYSTEM AND METHOD FOR USE OF FEATURE CODES IN A WIRELESS COMMUNICATION DEVICE

(75) Inventors: Bilhan Kirbas, San Diego; Eric J. Lekven, Carlsbad, both of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/041,089

(22) Filed: Mar. 10, 1998

(51) Int. Cl.[7] ................................................ H04Q 7/32
(52) U.S. Cl. ........................ 455/564; 455/575; 379/216; 379/355
(58) Field of Search ................................ 455/403, 414, 455/415, 550, 564, 566, 575; 379/216, 355, 356

(56) References Cited

U.S. PATENT DOCUMENTS

| | | | |
|---|---|---|---|
| 5,455,858 A | 10/1995 | Lin | 379/355 |
| 5,459,774 A | 10/1995 | Breeden | 455/566 |
| 5,475,743 A | * 12/1995 | Nixon et al. | 379/355 X |
| 5,592,546 A | 1/1997 | Takahashi | 379/355 |

FOREIGN PATENT DOCUMENTS

| | | | | |
|---|---|---|---|---|
| EP | 0768785 | 4/1997 | ............ | H04M/1/57 |
| WO | 9203882 | 5/1992 | .......... | H04M/11/00 |
| WO | 9422260 | 9/1994 | .......... | H04M/11/00 |
| WO | 9711546 | 3/1997 | .......... | H04M/1/274 |

* cited by examiner

Primary Examiner—Fan Tsang
Assistant Examiner—Philip J. Sobutka
(74) Attorney, Agent, or Firm—Philip R. Wadsworth; Roger Martin; Raymond B. Hom

(57) ABSTRACT

A wireless communication device contains a speed-dial storage area containing one or more user-entered destination telephone numbers. An additional memory area contains the plurality of sets of additional digits to be added to the user-entered destination telephone number. The user associates one or more additional sets of digits to a selected user-entered destination telephone number. A control processor automatically adds the associated set of additional digits whenever the user-entered destination telephone number is selected. The sets of additional digits may be pre-programmed by the service provider or programmed by the user. The sets of additional digits may include codes for features such as caller identification transmission, caller identification blocking, message waiting cancellation, and the like. In addition, other sets of digits, such as area codes and other prefixes may be pre-programmed by the service provider or the user. The additional sets of digits may be added to all subsequent calls to the selected user-entered destination telephone number until the control processor is selectively disabled. The processor may be disabled by manual intervention by the user or by turning the power-off to the wireless communication device.

15 Claims, 8 Drawing Sheets

SYSTEM AND METHOD FOR USE OF FEATURE CODES IN A WIRELESS COMMUNICATION DEVICE

BACKGROUND OF THE INVENTION

I. Field of the Invention

The present invention is related generally to a wireless communication device, and more particularly, to a system and method for using feature codes in a wireless communication system.

II. Description of the Related Art

Wireless communication devices, such as cellular telephones, are widely used as a replacement for conventional telephone systems. In addition to functioning as a replacement for a convention telephone, wireless communication devices offer the advantage of portability, thus enabling the user to establish a wireless communication link from almost any location on Earth to almost any other location on Earth.

To establish a communication link using a typical wireless communication device, the user enters the desired destination telephone number (e.g., 555-1234) and presses a "SEND" button. Frequently used telephone numbers may be stored in a speed-dialing storage area within the wireless communication device. To establish a communication link with a telephone whose number is stored in the speed-dialing storage area, the user simply recalls the desired speed-dialing location and presses the SEND button.

One disadvantage of the conventional wireless communication device is that the user must manually enter additional digits to use feature codes. For example, feature codes such as "*82" can be pre-pended to the destination telephone number to transmit call identification data (i.e., caller-ID) to the destination telephone. Similarly, caller-ID can be blocked by pre-pending "*67" to the destination telephone number. If a speed-dial storage location is programmed with the telephone number 555-1234, the telephone number in the speed-dial location must be edited to utilize the feature codes. To use the feature codes, the user must memorize the feature codes and the function associated with each of the feature codes.

Some prior art wireless communication systems do include an edit mode that permits the user to manually pre-pend feature codes to existing telephone numbers in the speed-dial storage locations. However, such a system is cumbersome because the user must enter the edit mode, manually add the desired digits, and exit the edit mode prior to initiating the call. Furthermore, the user must manually edit the data in the selected speed-dial location each time a call is initiated.

Therefore, it can be appreciated that there is significant need for a system and method to automatically pre-pend feature codes to destination telephone numbers in a wireless communication device to thereby provide a complete destination telephone number. The present invention provides this and other advantages as will be illustrated by the following description and accompanying figures.

SUMMARY OF THE INVENTION

The present invention is embodied in a system and method for the automatic addition of digits to a destination telephone number in a wireless communication device. In an exemplary embodiment, the system comprises a keypad input device to permit user entry of a destination telephone number. A memory contains a plurality of sets of additional digits to be added to the user-entered destination telephone number. The system further includes a user-controllable enable signal to selectively enable the addition of sets of additional digits from the memory. A control processor automatically adds a first one of the sets of additional digits to the user-entered destination telephone number to thereby generate a complete destination telephone number.

In an exemplary embodiment, the control processor can automatically add a second one of the sets of additional digits from the memory to the user-entered destination telephone number to thereby generate a complete destination telephone number. The system may further include a speed-dial storage area to store a plurality of destination telephone numbers. In this embodiment, the user-entered destination telephone number may be selected from the speed-dial storage area. The system may further include an indicator stored in the speed-dial storage area in association with the user-entered destination telephone number selected from the speed-dial storage area. The indicator is used to indicate an association of the first set of additional digits with the user-entered destination telephone number selected from the speed-dial storage area.

In one embodiment, at least a portion of the sets of additional digits are pre-programmed into the memory by a service provider. Alternatively, at least a portion of the sets of additional digits may be pre-programmed into the memory by the user.

The system may also include a display that displays the completed destination telephone number. A transmitter within the system may transmit the completed destination telephone number only if the user confirms the displayed destination telephone number by activating the keypad input device in a pre-determined manner.

The system may be selectively activated to add the first set of additional digits to the user-entered destination telephone number in all subsequent calls to the user-entered destination telephone number until the control processor is selectively disabled. Alternatively, the wireless communication device has a power-on mode and a power-off mode. In this embodiment, the control processor adds the first set of additional digits to the user-entered destination telephone number in all subsequent calls to the user-entered destination telephone number until the wireless communication device enters the power-off mode. The control processor is disabled when the wireless communication device enters the power-off mode.

DETAILED DESCRIPTION OF THE PREFERRED EMBODIMENTS

The present invention provides a technique for automatically pre-pending feature codes to a destination telephone number to thereby generate a complete destination telephone number. For purposes of the present discussion, a "complete" destination telephone number is one in which one or more prefix digits are pre-pended to a user-entered partial destination telephone number to generate a destination telephone number which will be satisfactory for completion of the desired telephone call in the manner desired by the user. For purposes of the present discussion, a "partial" destination telephone number is one in which the user-entered telephone number does not supply sufficient information to complete the telephone call in the manner desired by the user (e.g., with caller-ID). The present invention automatically pre-pends the necessary digits to the partial destination telephone number to thereby generate a complete destination telephone number.

The telephone system in the United States requires the entry of seven digits for a complete local telephone number and ten digits for a long distance call. However, the user must pre-pend prefix digits to the local or long distance call to implement features, such as caller-ID, and the like. The present invention conveniently provides the user with a list of call features and automatically pre-pends the necessary digits to the user-entered destination telephone number. In addition, as will be discussed in detail below, the present invention can automatically add the necessary pre-pended digits to subsequent telephone calls to the user-entered destination telephone number.

Figure 1:
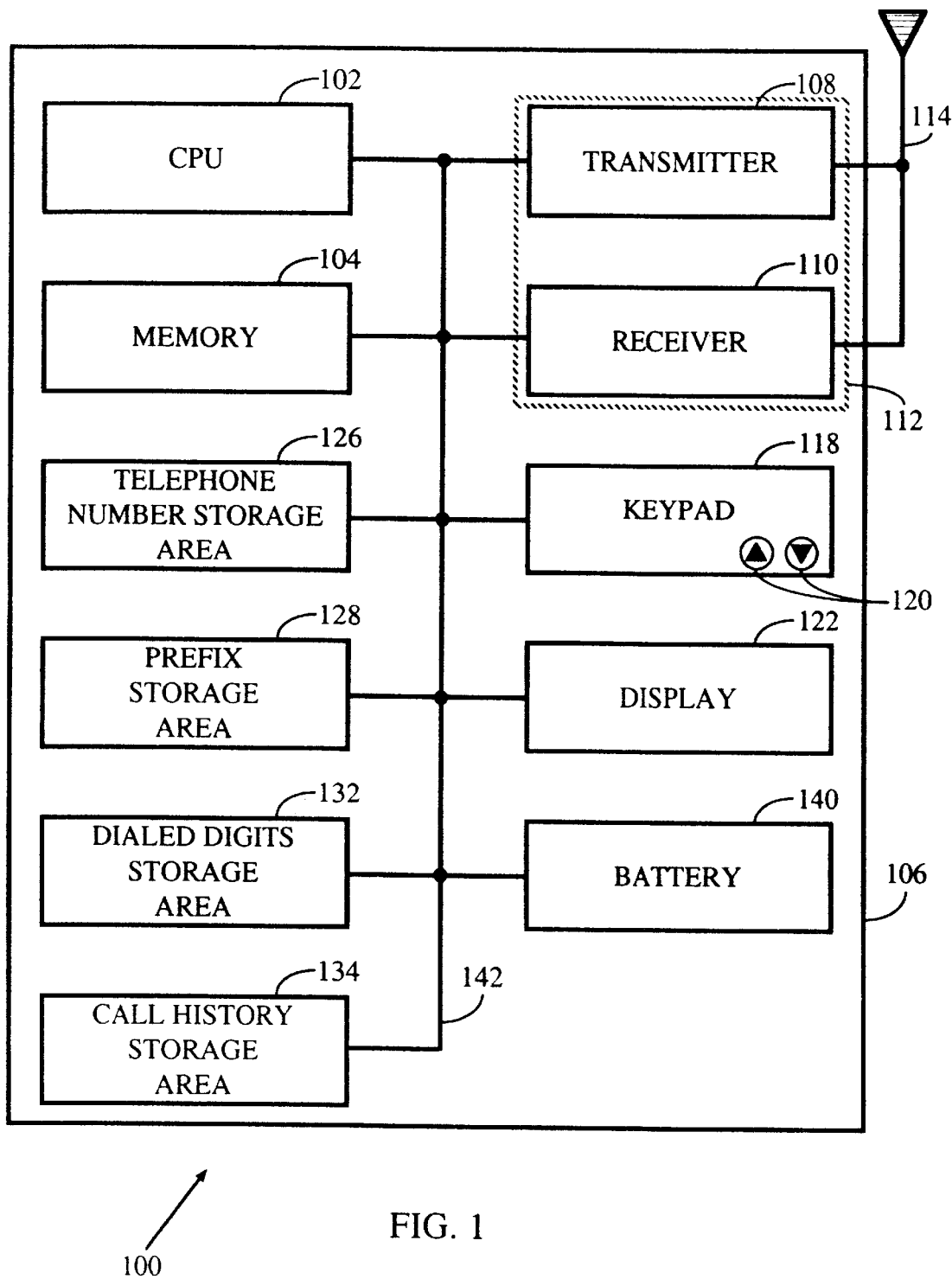
FIG. 1 is a functional block diagram of an exemplary embodiment of the wireless communication device of the present invention.

The present invention is embodied in a system 100 illustrated in the functional block diagram of FIG. 1. The system 100 includes a central processing unit (CPU) 102, which controls operation of the system. A memory 104, which may include both read-only memory (ROM) and random access memory (RAM), provides instructions and data to the CPU 102. A portion of the memory 104 may also include non-volatile random access memory. As will be discussed in greater detail below, the non-volatile random access memory portion of the memory 104 may be used to store destination telephone numbers and feature codes.

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a cell site controller (not shown). The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein.

A keypad 118 is attached to the housing 106 for operation by the user in a conventional manner. As will be described below, the keypad 118 provides a convenient input device by which destination telephone numbers may be entered by the user. The keypad 118 also includes one or more scroll buttons 120 that allow the user to sequentially move through the stored destination telephone numbers. The scroll buttons 120 also provide a convenient technique for selecting feature codes for pre-pending to a user-entered destination telephone number.

The system 100 also includes a display 122 that may conveniently used to display instructions to the user as well as user-entered data, such as destination telephone numbers. In an exemplary embodiment of the system 100, the display 122 will display a completed destination telephone number for the user prior to initiation of a telephone call.

The user-entered data, such as partial destination telephone numbers, are entered into the system 100 using the keypad 118 and may be stored in a telephone number storage area 126, which is sometimes referred to as a speed-dial storage area. The telephone number storage area 126 may be included in the non-volatile memory portion of the memory 104 or may be a separate storage area. While depicted as a conventional memory, those skilled in the art can appreciate that the telephone number storage area 126 may be any suitable data structure.

The system 100 also includes a dialed digits storage area 132 to temporarily store the destination telephone number. The dialed digits storage area 132 receives the partial telephone number entered by the user via the keypad 118 if the user is manually entering the desired destination telephone number. However, the system 100 will automatically enter the partial destination telephone number selected from the telephone number storage area 126 into the dialed digits storage area 132 in response to the user selection one of the stored destination telephone numbers.

A prefix storage area 128 is used to store one or more feature codes that may be predefined by the telephone service provider or defined by the user. As will be discussed in detail below, the user can easily select feature codes from the prefix storage area 128 and add them to the partial destination telephone number to generate the complete destination telephone number. Once selected by the user, the feature codes may be automatically pre-pended to subsequent calls to the particular destination telephone number or pre-pended to all subsequently entered destination telephone numbers.

When the user enters a partial destination telephone number or selects a partial destination telephone number from the telephone number storage area 126, the partial destination telephone number is supplemented by adding feature codes to generate a complete destination telephone number. The complete destination telephone number is stored in the dialed digits storage area 132. In operation, the transmitter 108 transmits the data in the dialed digits storage area 132 to initiate a telephone call to the destination telephone whose telephone number is stored in the dialed digits storage area.

A call history storage area 134 stores a predetermined number of previously dialed destination telephone numbers. For example, the call history storage area 134 may store the destination telephone numbers from the last ten phone calls. The data in the dialed digits storage area 132 is transferred to the call history storage area when a telephone call is initiated. The call history storage area 134 is conveniently used to recall previously dialed telephone numbers. In an exemplary embodiment, the complete destination telephone number is stored in the call history storage area 134. In an alternative embodiment, only the partial destination telephone number will be stored in the call history storage area 134. In this alternative embodiment, the user can selectively control whether the feature codes will be pre-pended to the partial destination telephone number if using destination telephone numbers stored in the call history storage area 134.

The components of the system 100 are powered by a battery 140. In an exemplary embodiment, the battery 140 is a rechargeable battery. Alternatively, the system 100 may be powered by an external source, such as an AC adapter (not shown), an automobile power supply adapter (not shown), or the like.

The various components of the system 100 are coupled together by a bus system 142, which may include a power bus, control signal bus, and status signal bus addition to a data bus. However, for the sake of clarity, the various bus illustrated in FIG. 1 as the bus system 142.

The operation of the system 100 to add prefixes to the partial destination telephone number may now be described. In an exemplary embodiment, the prefix storage area 128 has a structure illustrated in the table below.

TABLE 1

Prefix Table

| Prefix No. | Prefix Digits | Definition |
|---|---|---|
| 0 | 312 | Chicago |
| 1 | 011 | International |
| 2 | *82 | Caller-ID |
| 3 | *67 | Block ID |
| 4 | *70 | Message Cancel |
| 5 | *82 619 | Caller-ID San Diego |
| . | . | . |
| . | . | . |
| . | . | . |
| 9 | — | — |

Table 1 illustrates ten prefix storage locations that each include prefix digits and a definition or description of the prefix digits. It should be understood that the number of prefix storage locations, the number of prefix digits, and the number of characters in the definition/description is limited only by the storage capacity of the prefix storage area 128. The present invention is not limited by the specific size of the prefix storage area 128. In one embodiment, the feature codes, such as caller-ID, may be preprogrammed by the manufacturer or preprogrammed by the service provider at the time the wireless communication device is purchased. Alternatively, the user may enter the desired feature codes or additional prefixes, such as area codes, long distance codes, and the like. Table 1 illustrates this embodiment where a combination of feature codes and long distance codes have been entered in the prefix storage area 128. For example, prefix number 5 includes both a feature code (i.e., *82) and an area code (i.e., 619). Thus, the user may enter one or more feature codes or other prefixes in the prefix storage area 128.

Figure 2A:
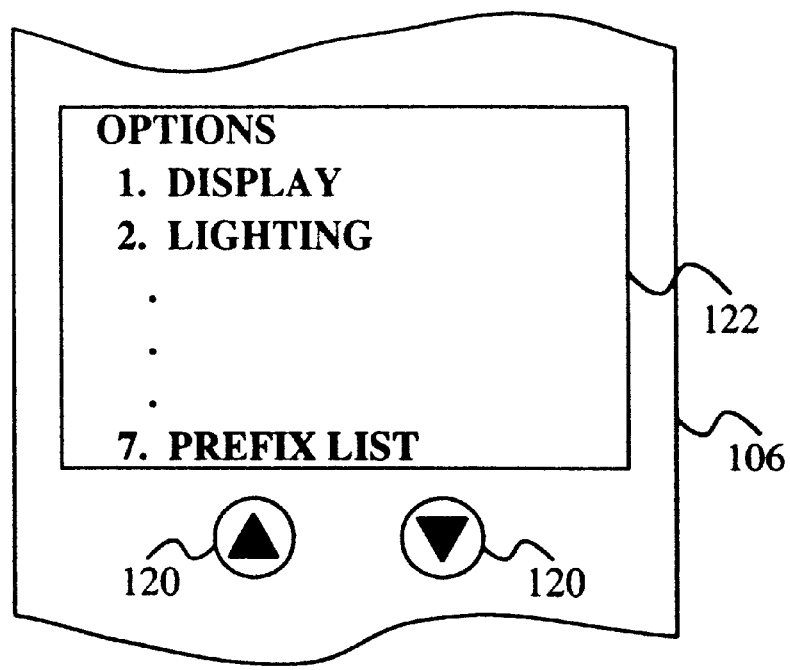
FIG. 2A illustrates a technique to enable an option to select prefixes used by the wireless communication device of FIG. 1.
Figure 2B:
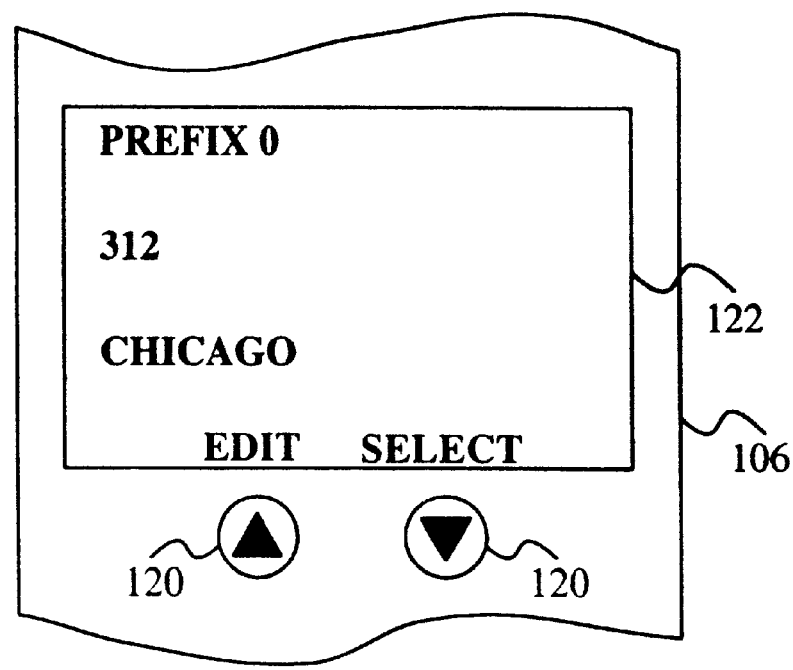
FIG. 2B illustrates the display of prefix data by the wireless communication device of FIG. 1.

FIGS. 2A–2D provide an example of a programming technique used to enter data into the prefix storage area 128. The use of option lists in a wireless communication device is well known. In FIG. 2A, an options list shown on the display 122 includes a prefix list option. The user operates the scroll buttons 120 in a known fashion to select the prefix list option. In FIG. 2B, the prefix list option has been selected and the first prefix (i.e., prefix 0) is shown on the display 122. The user may activate the down scroll button 120 to select a different prefix from the prefix storage area 120 or activate the up scroll button 120 to edit the currently displayed prefix.

Figure 2C:
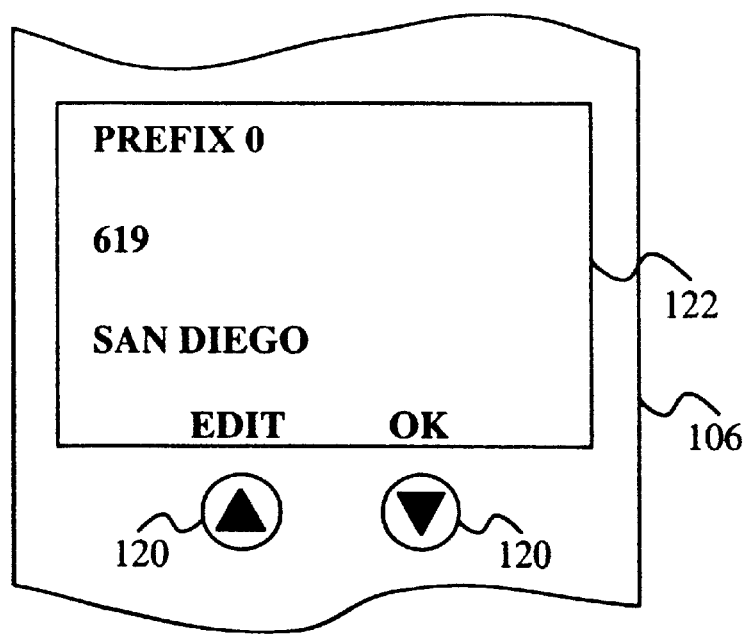
FIG. 2C illustrates the editing of prefix data by the wireless communication device of FIG. 1.

FIG. 2C illustrates an example of editing the currently displayed prefix. In FIG. 2C, the previous area code has been replaced by area code 619 and a description of the user-entered prefix indicating that the area code corresponds to the San Diego area. The user may activate the up scroll button 120 to further edit the currently displayed entry, or activate the down scroll button 120 to confirm the editing changes made to the currently displayed data. If the user activates the down scroll button 120 to confirm the edited display, the system 100 may change to the display of FIG. 2D to query the user whether the new item should be added to the prefix storage area 128. The user activates the up or down scroll buttons 120 in the desired manner. If the user activates the up scroll button 120, the edited data is stored in the prefix storage area 128. The user may edit other entries in the prefix storage area in a similar manner. Those skilled in the art can appreciate that other techniques commonly used to select options in a wireless communication device can be used to enter new data in the prefix storage area 128 or to edit existing entries in the prefix storage area.

The prefixes may be selected from the prefix storage area 128 and associated with partial destination telephone numbers entered by the user via the keypad 118 (see FIG. 1) or associated with speed-dial telephone numbers in the telephone number storage area 126. The table below provides an exemplary embodiment of a technique used to associate one or more prefixes with a partial destination telephone number stored in the telephone number storage area 126.

TABLE 2

Telephone Number Storage Area

| Location No. | Stored No. | Prefix Association |
|---|---|---|
| 0 | 555-1234 | 2, 0 |
| 1 | — | — |
| 2 | — | — |
| 3 | — | — |
| 4 | 555-1235 | 5 |
| . | . | . |
| . | . | . |
| . | . | . |
| 99 | — | — |

As illustrated in Table 2, a number of speed-dial storage locations are available in the telephone number storage area 126. The actual number of storage locations available depends on such factors as the amount of non-volatile RAM available for the user. However, the present invention is not limited by the specific number of available storage locations in the telephone number storage area 126. In the example illustrated in Table 2, storage location 0 contains the partial destination telephone number 555-1234. Also stored in Table 2, in association with storage location 0, are the prefixes 2 and 0. The prefix association values indicate locations within the prefix storage area 128 where the appropriate prefixes may be found and automatically pre-pended to the stored number to thereby generate a complete destination telephone number. In the example illustrated in Table 2, the storage location 0 includes the stored partial destination telephone number 555-1234 and pointers to the prefixes *82 and 312, respectively, in the prefix storage area 128 using the example of Table 1. The example illustrated in Table 1 includes the area code 312, corresponding to the Chicago area, in storage location 0. However, in the example illustrated in FIGS. 2A–2D, prefix number 0 was edited to the prefix 619, associated with the San Diego area. In this example, the prefix association in the speed-dial storage location 0 in the telephone number storage area 126 would include the area code 619. Thus, whenever the user recalls speed-dial storage location 0 from the telephone number storage area 126, the associated prefixes are automatically pre-pended to the stored telephone number to thereby generate a complete destination telephone number.

In another example, the speed-dial storage location 4 contains the stored telephone number 555-1235. Associated with the speed-dial storage location 4 is the prefix 5, which when referring to Table 1, contains the feature code *82 along with the area code 619. Thus, when the user selects the speed-dial location 4 from the telephone number storage area 126, the system 100 automatically pre-pends *82 619 to the stored telephone number 555-1235 to thereby generate a completed destination telephone number 82 619 555-1235.

Figure 2D:
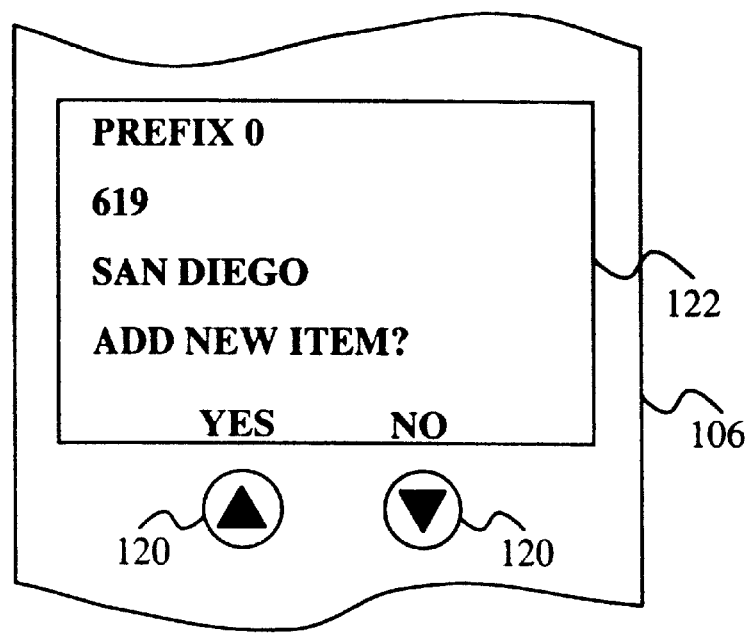
FIG. 2D illustrates a technique for storing prefix data used by the wireless communication device of FIG. 1.
Figure 3A:
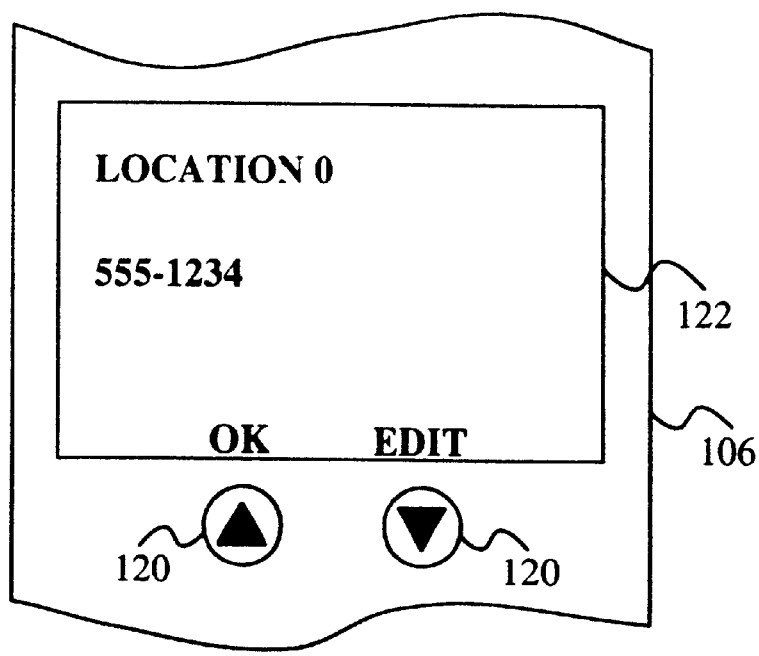
FIG. 3A illustrates a technique used by the wireless communication device of FIG. 1 to associate prefixes with a selected destination telephone number.
Figure 3B:
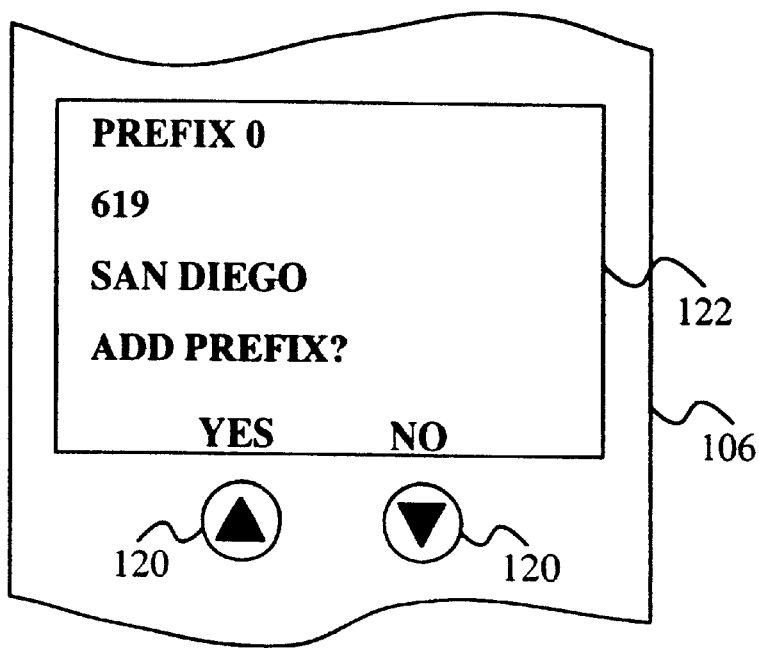
FIG. 3B illustrates the display used by the wireless communication device of FIG. 1 to store an associated prefix with a selected destination telephone number.

The process of associating a selected prefix from the prefix storage area 128 with a speed-dial location in the telephone number storage area 126 is illustrated in FIGS. 3A and 3B. In FIG. 3A, the user has recalled the partial destination telephone number in the speed-dial storage location 0, containing the partial destination telephone number 555-1234, using conventional techniques. The user may edit the speed-dial storage location 0 by activating the down scroll button 120. In response to activation of the down scroll button 120, the system 100 displays the current contents of the prefix list stored in the prefix storage area 128. In FIG. 3B, the prefix location 0 is shown on the display 122. In the example of FIG. 3B, the prefix location 0 has been edited (see FIGS. 2A–2D) and now contains the area code 619 associated with the San Diego area. The user may select a different prefix from the prefix list stored in the prefix storage area 128 (see FIG. 1) by activating the down scroll button 120. If the user wishes to associate the displayed prefix, the user activates the up scroll button 120 to add the prefix association to the selected speed-dial storage location. If the user activates the up scroll button 120, the prefix association is stored in the telephone number storage area 126 in association with the selected speed-dial storage location. Thus, the system 100 offers a simple and flexible technique by which the user may add one or more prefixes to telephone numbers stored in the telephone number storage area 126. For example, a user from the San Diego, area may normally use the telephone number in the speed-dial storage location 4 without adding any additional prefixes. However, when traveling to a location outside the San Diego area, the user can quickly select one or more prefixes to associate with the stored telephone number and the selected prefixes will be automatically pre-pended to the stored telephone number whenever the user subsequently recalls the selected speed-dial location in the telephone number storage area 126. In the example shown in Table 2 above, the system 100 automatically pre-pends *82 619 to the partial destination telephone number 555-1235 in the speed-dial storage location 4.

Figure 4:
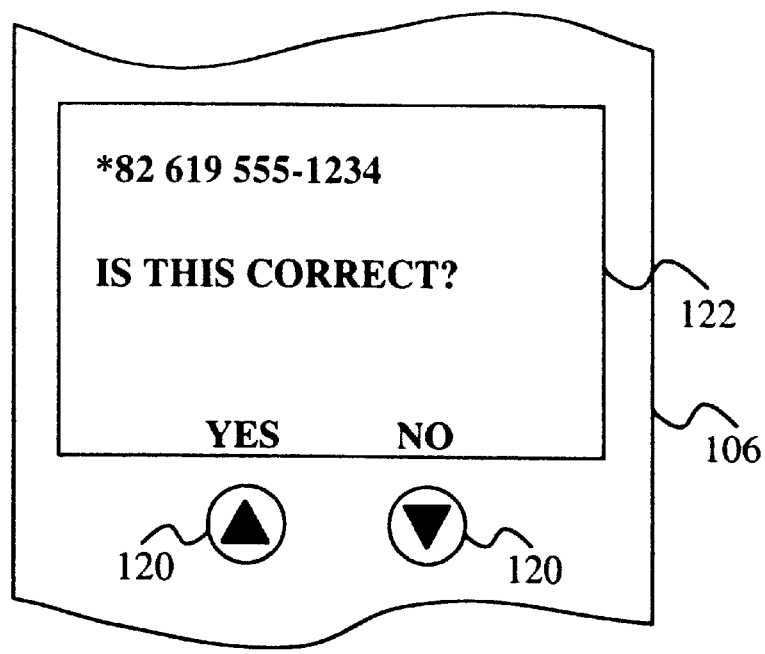
FIG. 4 illustrates a technique used by the wireless communication device of FIG. 1 to confirm a destination telephone number in which one or more prefixes have been pre-pended to a stored telephone number.

In an exemplary embodiment, the system 100 automatically pre-pends the associated prefixes to the partial destination telephone number selected from the telephone number storage area 126. In an alternative embodiment, the system 100 may request confirmation from the user that the complete destination telephone number is correct. This is illustrated in FIG. 4 where the completed destination telephone number is shown on the display along with a message requesting confirmation by the user. If the user activates the up scroll button 120, the system 100 will initiate a wireless communication link between the wireless communication device and the communication device associated with the completed destination telephone number.

Figure 5:
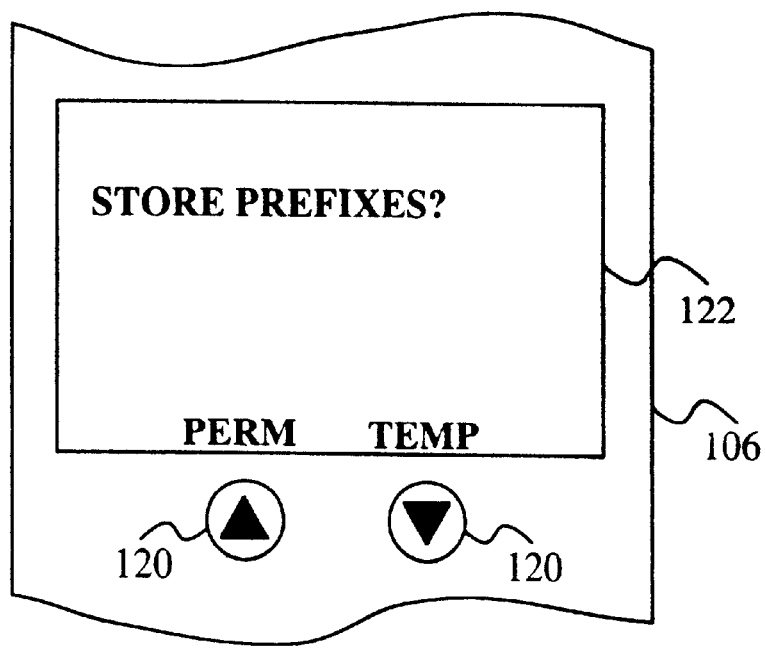
FIG. 5 illustrates the operation of the wireless communication device of FIG. 1 to store associated prefixes and destination telephone numbers.

In an exemplary embodiment, the system 100 stores the selected prefixes until the wireless communication device is turned off. At that point, all prefix associations are deleted. However, the destination telephone numbers stored in the telephone number storage area 126 (see FIG. 1) are not deleted. Alternatively, the system 100 can display a message to the user to determine whether the associated prefixes should be retained even after power is turned off to the wireless communication device. This is illustrated in FIG. 5 where the display 122 provides the user with an option to store the associated prefixes permanently, by selecting the up scroll button 120, or by storing the associated prefixes temporarily, while the power remains on, by activating the down scroll button 120.

Figure 6A:
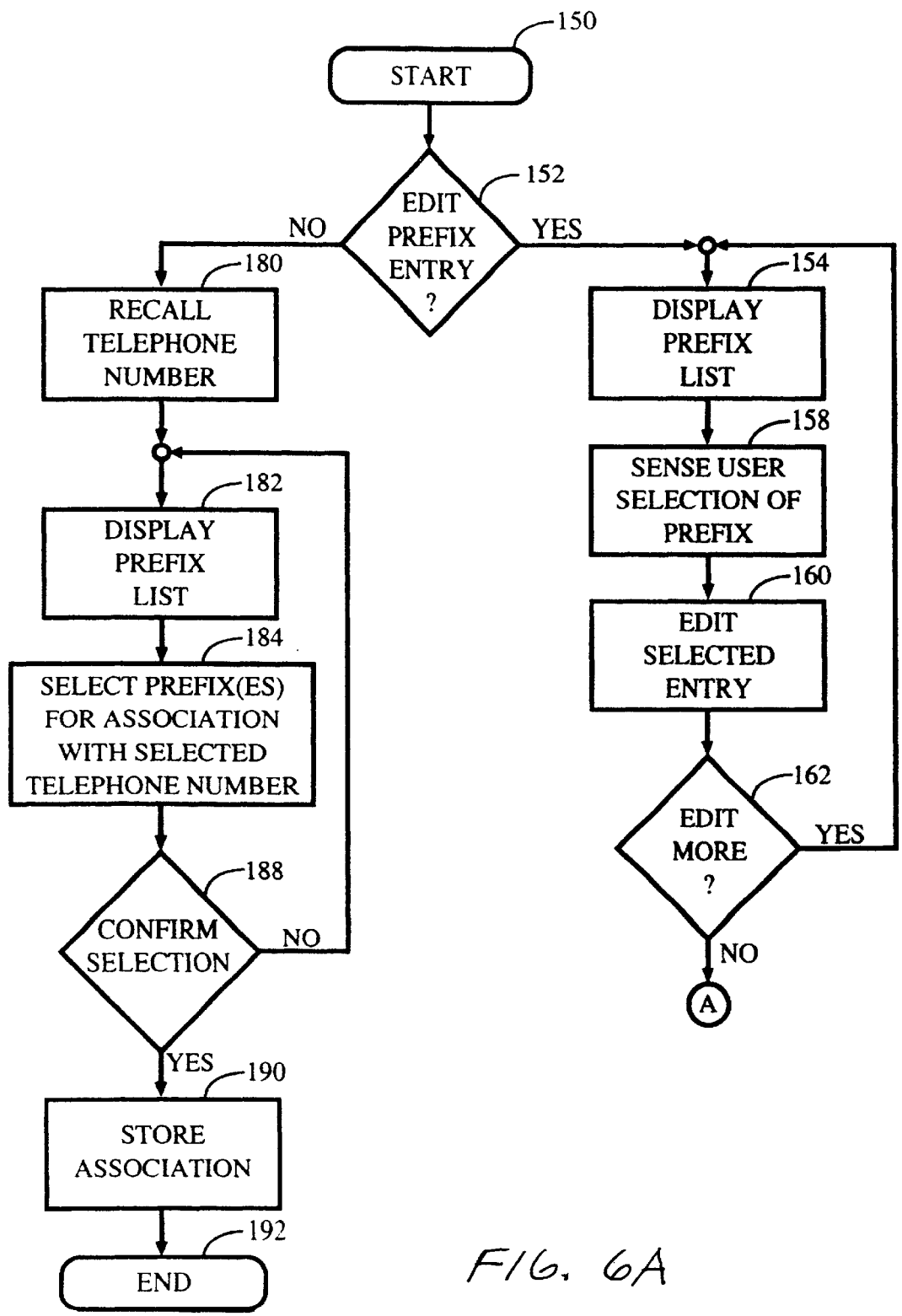
FIGS. 6A and 6B together form a flowchart illustrating the operation of the wireless communication device of FIG. 1 to define prefixes and associate prefixes with a destination telephone number.
Figure 6B:
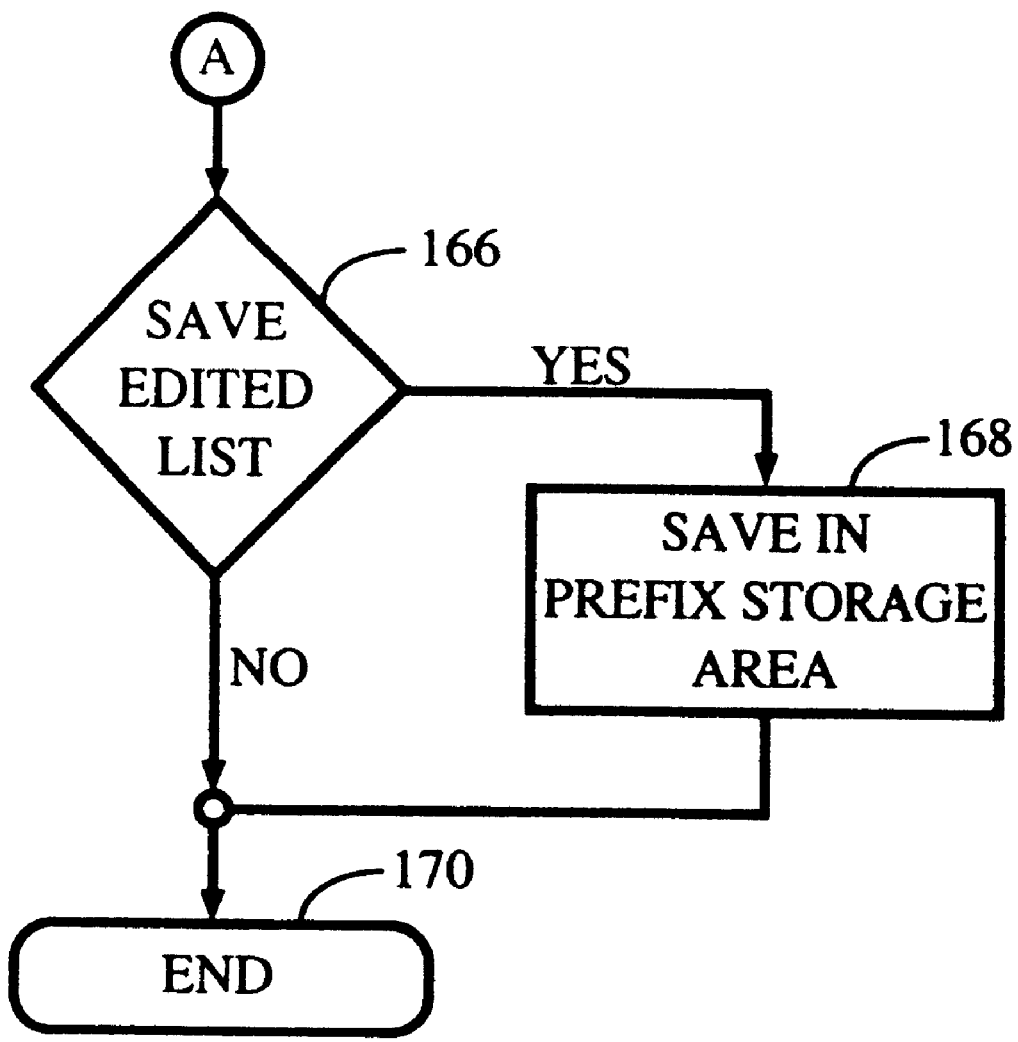

The operation of an exemplary embodiment of the system 100 is illustrated in the flowchart of FIGS. 6A and 6B. At a start 150, illustrated in FIG. 6A, the wireless communication device is under power. At decision 152, the system 100 determines whether the user wishes to edit a prefix entry. An example of this step is illustrated in FIG. 2A where a list of options are shown on the display 122 for selection by the user. If the user selects the prefix list option, the result of decision 152 is YES. In that event, in step 154, the system 100 displays the prefix list from the prefix storage area 128 (see FIG. 1) on the display 122. In step 158, the system 100 senses user activation of the keypad 118 to select one of the prefixes from the list. As described above, the user may, by way of example, activate the scroll buttons 120 to select the desired prefix for editing.

In step 160, the system 100 senses user activation of the keypad 118 and/or scroll buttons 120 to edit the selected prefix entry. In decision 162, the system determines whether the user wishes to edit more prefix entries. The user may edit one or more prefix entries in a single editing session. This editing may include altering existing data in the prefix storage area 128 (see FIG. 1), entering new prefix data into previously unused locations in the prefix storage area, or clearing existing prefix data from the prefix list. If the user wishes to edit additional entries in the prefix list 128, the result of decision 162 is YES. In that event, the system 100 returns to step 154 to display the prefix list for additional editing by the user. If the user has completed the editing process, the result of decision 162 is NO. In that event, in decision 166, illustrated in FIG. 6B, the system 100 determines whether the user wishes to save the edited list. This is illustrated in FIG. 2D where the user is asked to confirm whether or not to add the newly edited prefix data to the prefix storage area 128. If the user wishes to save the edited data, the result of decision 166 is YES and the system 100 saves the edited data in the prefix storage area 128 in step 168 and ends the editing process at 170. If the user does not wish to save the edited list, the result of decision 166 is NO and the process ends at 170 without saving the edited prefix data in the prefix storage area 128.

The operation of the system 100 to recall partial destination telephone numbers from the telephone number storage area 126 (see FIG. 1) and to automatically pre-pend selected prefix data is also illustrated in the flowchart of FIG. 6A. Returning again to FIG. 6A, if the user does not wish to edit a prefix entry, the result of decision 152 is NO. In step 180, the system 100 senses user activation of the keypad 118 and/or scroll buttons 120 to recall a partial destination telephone number from the telephone number storage area 126. The recall of data from a specific speed-dial location in the telephone number storage area 126 is accomplished in a well-known fashion, and is illustrated in an exemplary embodiment in FIG. 3A. In step 182, the system 100 displays at least part of the prefix list on the display 122. The user selects one or more prefixes for association with the selected partial destination telephone number. This process is illustrated in FIGS. 3A and 3B where a selected speed-dial location from the telephone number storage area 126 is associated with one or more prefixes selected from the prefix storage area 128.

In decision 188, the user is asked to confirm the selection of prefixes for association with the selected partial destination telephone number. If the user does not confirm selection, the result of decision 188 is NO, and the system returns to step 182 to display the prefix list to associate one or more other prefixes with the selected partial destination telephone number. If the user confirms selection of the prefixes, the result of decision 188 is YES and, in step 190, the system 100 stores the prefix associations in the telephone number storage area 126. The process ends at 192. Thus, the user can create a customized prefix list and associate one or more prefixes with selected destination telephone numbers from the telephone number storage area 126. Alternatively, as described above, the user may be limited to feature codes that are preprogrammed into the prefix list 128 by the manufacturer of the wireless communication device or by the service provider at the time the wireless communication device is purchased and programmed for operation.

Figure 7:
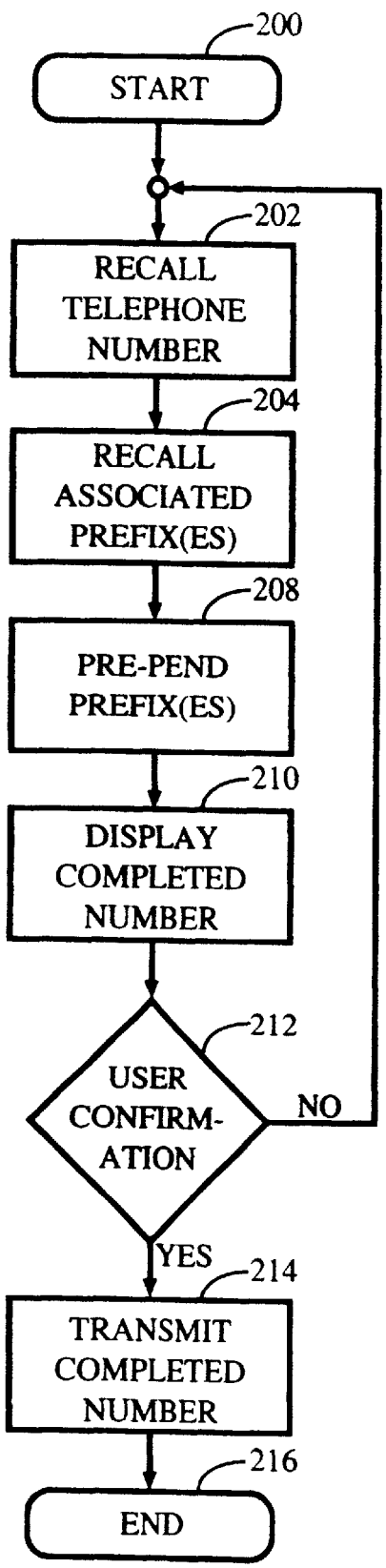
FIG. 7 is a flowchart illustrating the operation of the wireless communication device of FIG. 1 to automatically pre-pend prefixes to a destination telephone number.

The operation of the system 100 to automatically pre-pend one or more prefixes to partial destination telephone numbers is illustrated in the flowchart of FIG. 7 where, at a start 200, the wireless communication device is under power. In step 202, the system 100 senses user input to recall a selected one of the destination telephone numbers from the telephone number storage area 126. In step 204, the system 100 recalls one or more prefixes from the prefix storage area 128 that are associated with the selected partial destination telephone number. As illustrated in Table 2 above, the system 100 permits the association of prefixes from multiple prefix storage locations in the prefix storage area 128 (see FIG. 1) with each speed-dial location in the telephone storage area 126.

In step 208, the system 100 automatically pre-pends the associated prefixes to the partial destination telephone number to thereby generate a complete destination telephone number. In step 210, the completed destination telephone number is shown on the display 122 (see FIG. 1). In decision 212, the user is asked to confirm the addition of prefixes to the partial destination telephone number. It should be noted that the process of display and confirmation illustrated in step 210 and decision 212 is optional, but provides the user with an opportunity to confirm the selection of the pre-pended digits. If the user does not confirm the displayed completed destination telephone number, the result of decision 212 is NO and the system returns to step 202 to restart the process by recalling a telephone number from the telephone number storage area 126. If the user does confirm the completed destination telephone number shown on the display 122, the result of decision 212 is YES. In that event, the transmitter 108 (see FIG. 1) transmits the completed destination telephone number to a remote location, such as a cell site controller (not shown) and ends the process at 216.

Thus, the system 100 provides great flexibility in programming prefixes, such as feature codes, area codes, and the like, and provides a simple technique for associating one or more selected prefixes with a stored destination telephone number. Various embodiments of the system 100 have been described above. For example, the prefix storage area 128 may be preprogrammed by the manufacturer or service provider such that the user is limited to the selection of preprogrammed feature codes. Alternatively, the system 100 may provide the user with programming capability to select only the feature codes desired by the user. In addition, the user may also enter other prefix data, such as area codes, long distance codes, and the like. The prefix storage area 128 may contain individual prefixes or combinations of prefixes.

In addition, a selected speed-dial storage location in the telephone number storage area 126 may be associated with one or more prefixes from the prefix storage area 128. As described above, a plurality of single prefixes may be associated with the selected destination telephone number in the telephone number storage area 126. Alternatively, the prefix storage area 128 may contain multiple prefixes within a single storage location. In this embodiment, only a single prefix storage location from the prefix storage area 128 need be associated with the selected destination telephone number. Furthermore, the multiple speed-dial locations in the telephone number storage area 126 may be associated with the same prefixes in the prefix storage area 128. For example, the prefix *82 may be associated with several partial destination telephone numbers in the telephone number storage area 126.

The system 100 also provides multiple options for storing the associated prefixes on a permanent basis even if power is turned off to the wireless communication device. In an alternative embodiment, the user may elect to temporarily associate the selected prefixes with the selected destination telephone numbers only until the power is turned off the wireless communication device.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

We claim:

1. A wireless communication device comprising:

a housing;

a transceiver within the housing to communicate with a communication device remote from the system;

an antenna affixed to the housing and electrically coupled to the transceiver;

a battery to provide electrical power to the system;

a memory containing a plurality of feature codes;

a display;

a keypad input device affixed to the housing to sense user operation thereof to enter a destination telephone number and to select a feature codes for association with the user-entered destination telephone number; and a control processor to automatically pre-pend the associated feature codes to the user-entered destination telephone number to thereby generate a complete destination telephone number, wherein the control processor is selectively enabled and adds the associated feature codes to the user-entered destination telephone number in all subsequent calls to the user-entered destination telephone number until the control processor is selectively disabled, the transceiver transmitting the complete destination telephone number to establish a wireless communication link with the communication device associated with the complete destination telephone number.

2. The system of claim 1 wherein the wireless communication device has a power-on mode and a power-off mode, wherein the control processor is selectively enabled when the wireless communication device enters the power-on mode and the control processor adds the associated feature codes to the user-entered destination telephone number in all subsequent calls to the user-entered destination telephone number until the wireless communication device enters the power-off mode, the control processor being disabled when the wireless communication device enters the power-off mode.

3. A system for the automatic addition of digits to a destination telephone number in a wireless communication device, the system comprising:

a housing;

a transceiver within the housing to communicate with a communication device remote from the system;

a keypad input device affixed to the housing to sense user operation thereof to enter a destination telephone number;

a data structure containing a plurality of predefined prefixes;

a control processor to automatically add a selected one of the plurality of prefixes to the user-entered destination telephone number to thereby generate a complete destination telephone number, the transceiver transmitting the complete destination telephone number to establish a wireless communication link with the communication device associated with the complete destination telephone number; and a speed-dial storage area to store a plurality of destination telephone numbers wherein the user-entered destination telephone number is selected from the speed-dial storage area and the selected prefix is associated with the user-entered destination telephone number selected from the speed-dial storage area.

4. The system of claim 3, further including an indicator stored in the speed-dial storage area in association with the user-entered destination telephone number selected from the speed-dial storage area to indicate the association of the selected prefix with the user-entered destination telephone number selected from the speed-dial storage area.

5. The system of claim 3 wherein the control processor is selectively enabled to add the selected prefix to the user-entered destination telephone number.

6. The system of claim 5 wherein the control processor adds the selected prefix to the user-entered destination telephone number in all subsequent calls to the user-entered destination telephone number until the control processor is disabled.

7. The system of claim 5 wherein the wireless communication device has a power-on mode and a power-off mode and the control processor adds the selected prefix to the user-entered destination telephone number in all subsequent calls to the user-entered destination telephone number until the wireless communication device enters the power-off mode, the control processor being disabled when the wireless communication device enters the power-off mode.

8. A system for the automatic addition of digits to a destination telephone number in a wireless communication device, the system comprising:

a keypad input device to sense user operation thereof to enter a destination telephone number;

a memory containing a plurality of sets of additional digits to be added to the user-entered destination telephone number;

a user-controllable enable signal to selectively enable addition of sets of additional digits from the memory;

a control processor to automatically add a first one of the sets of additional digits to the user-entered destination telephone number to thereby generate a complete destination telephone number;

a speed-dial storage area to store a plurality of destination telephone numbers, the user-entered destination telephone number being selected from the speed-dial storage area; and an indicator stored in the speed-dial storage area in association with the user-entered destination telephone number selected from the speed-dial storage area to indicate an association of the first set of additional digits with the user-entered destination telephone number selected from the speed-dial storage area.

9. A method for the automatic addition of digits to a destination telephone number in a wireless communication device, the method comprising the steps of:

storing a plurality of sets of additional digits;

sensing user entry of a destination telephone number;

selectively enabling the addition of sets of additional digits from the plurality of stored additional digits;

if selectively enabled, automatically adding a first set of additional digits to the user-entered destination telephone number to thereby generate a complete destination telephone number; and selectively disabling the addition of sets of additional digits wherein the step of adding automatically adds the first set of additional digits to the user-entered destination telephone number in all subsequent calls to the user-entered destination telephone number until the step of selectively disabling the pre-pending of prefixes is performed.

10. The method of claim 9 wherein the step of adding automatically adds a second set of additional digits to the user-entered destination telephone number to thereby generate a complete destination telephone number.

11. The method of claim 10 wherein the step of enabling the addition of sets of additional digits is performed independently for the first and second sets of additional digits.

12. The method of claim 9, further including the step of storing a plurality of destination telephone numbers in a speed-dial storage area, the step of sensing user entry of a destination telephone number sensing user selection of a destination telephone number from the speed-dial storage area.

13. The method of claim 9 wherein the step of storing a plurality of sets of additional digits includes storing at least a portion of the sets of additional digits by the service provider.

14. The method of claim 9 wherein the step of storing a plurality of sets of additional digits includes storing at least a portion of the sets of additional digits by the user.

15. The method of claim 9, wherein the step of selectively disabling the adding of sets of additional digits being performed when the wireless communication device enters a power-off mode.

* * * * *